Nov. 18, 1958 — G. S. ALLIN, JR., ET AL — 2,860,426
LAND CLEARING RAKE
Filed April 2, 1954 — 2 Sheets-Sheet 1

Inventor
George S. Allin Jr.
William W. Henning
Paul O. Pippel Atty.

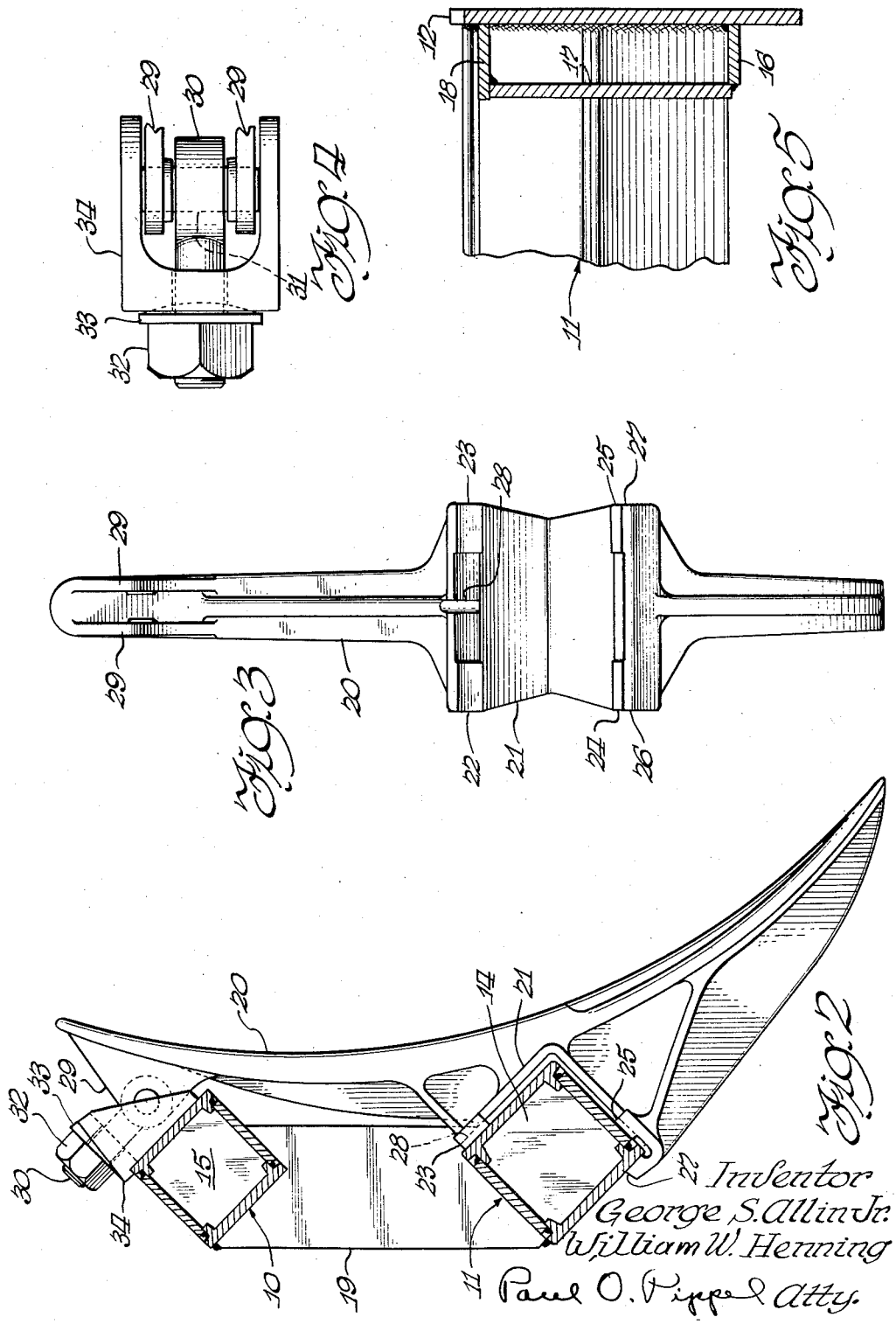

United States Patent Office 2,860,426
Patented Nov. 18, 1958

2,860,426
LAND CLEARING RAKE

George S. Allin, Jr., Homewood, and William W. Henning, Prospect Heights, Ill., assignors to International Harvester Company, a corporation of New Jersey Application April 2, 1954, Serial No. 420,528

8 Claims. (Cl. 37—2)

This invention relates generally to land clearing rakes, and more specifically to an improved land clearing rake for mounting at the forward end of a tractor.

Generally, land clearing rakes have been constructed to comprise a plurality of rake teeth which are bolted by a large number of nuts and bolts to a rake frame which is mounted at the forward end of a tractor. Because of the hard use these rakes usually receive, considerable difficulty has been experienced in the past in the removal and replacement of any one or more of the teeth of the rake. This difficulty is caused by the considerable damage which is usually done to the nuts and bolts which maintain the rake teeth mounted to the rake frame. Previous attempts to reduce the number of bolts used to fasten the rake teeth to the rake frame have met with failure in that the resulting rake assemblies have usually been weak. Therefore it is the object of this invention to provide a land clearing rake for mounting at the forward end of a tractor, wherein the rake teeth are assembled to the rake frame in a simple and positive manner, and whereby the removal and replacement of any one or more of the rake teeth is greatly simplified.

It is another object of this invention to provide a land clearing rake wherein the particular elements of the rake combine to form an extremely sturdy and reliable rake.

It is a feature of the present invention that each of the rake teeth are formed to have a certain resiliency to permit a springing of the rake teeth into proper mounting position on the rake frame.

Other objects and features of the present invention will be apparent upon a perusal of the following specification and drawings of which:

Figure 2 is a cross sectional view of the assembly shown in Figure 1 and taken along the line 2—2;

Figure 3 is a rear plan view of one of the rake teeth disassembled from the rake frame;

Figure 4 is a partial top plan view of the upper portion of the assembly shown in Figure 2; and Figure 5 is a cross sectional view of the assembly shown in Figure 1 and taken along the line 5—5.

Figure 1:
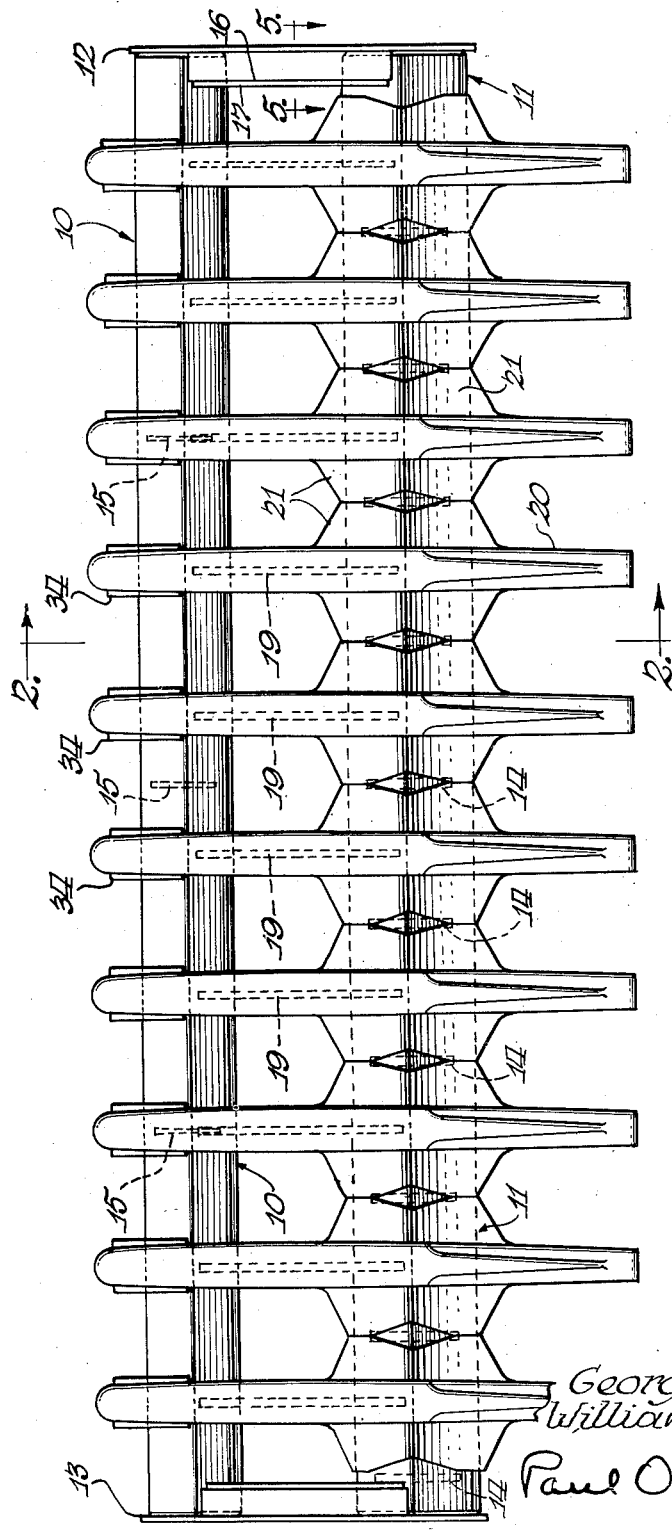
Figure 1 is a front plan view of one embodiment of the present invention.

The present embodiment is the preferred embodiment, but it is to be understood that changes can be made in the present embodiment by one skilled in the art without departing from the spirit and scope of this invention.

For a detailed description of the invention reference is made to the drawings. The rake frame comprises two horizontally disposed box channels 10 and 11. Each of the box channels 10 and 11 is formed of heavy metal plate, whereby the box channels may resist heavy torsional stresses. Each of the box channels 10 and 11 may be formed of four strips which are welded together along their longitudinal edges. Box channel 11 is reinforced by means of a plurality of substantially square plates 14. The plates are disposed in a spaced apart relationship to each other within the box channel 11 and are welded to the interior walls thereof. The box channel 10 is also reinforced by a plurality of substantially square plates. These plates are designated with the numeral 15 and are welded to the interior walls of the box channel 10 in a spaced apart relationship as can easily be seen in Figure 1. The box channels 10 and 11 are welded to end plates 12 and 13, with the box channel 10 disposed at the upper end of the plates 12 and 13 and with the box channel 11 disposed at the lower end of the plates 12 and 13. The box channels 10 and 11 are further positioned in relation to the vertical so that the sides thereof lie in inclined planes, as can easily be seen in Figure 2. To additionally strengthen the rake frame, plates 16, 17 and 18 are provided for cooperation with the box channels 10 and 11 and the end plate 12. The three plates 16, 17 and 18 are welded together and to the end plate 12 as shown in Figure 5. The plate 17, which is formed to have a V-shaped cut at each end thereof, is welded in cooperation with the lower two sides of the box channel 10 and the upper two sides of the box channel 11. The plates 16 and 18 are further welded to the box channels 10 and 11 at the ends thereof. The opposite end of the rake frame is constructed in an identical manner. To further strengthen the rake frame a plurality of plates 19, ten in number in the present embodiment, are provided. Each of the plates has a V-shaped cut at each end thereof and is generally shaped as shown in Figure 2. Each of the plates 19 are mounted in a spaced apart relationship to each other between the box channels 10 and 11 and are welded thereto as can easily be seen in Figures 1 and 2.

Turning next to a detailed description of the rake teeth, reference is again made to the drawings. Since all of the rake teeth are identical in construction, only one need be described in detail. The face of the tooth 20 is curved throughout the upper, intermediate and lower portions, and the radius of curvature of the face of the tooth 20 is greater when the tooth is mounted upon the rake frame as shown in Figure 2. The rake tooth 20 is contructed to have some resiliency and the change in the radius of curvature of the tooth when it is mounted to the rake frame aids in maintaining the rake tooth securely mounted to the rake frame.

The lower portion comprises an elongated and ribbed tooth element.

The intermediate portion of the tooth 20 has a right angle flange 21 formed on the rear thereof as can easily be seen in Figure 2. The right angle flange 21 is reinforced by a number of webs extending therefrom to the rear of the tooth 20. Six pads 22, 23, 24, 25, 26 and 27 are formed on the L-shaped flange 21. The two pads 22 and 23 are positioned at one end of one leg of the L-shaped flange 21 in a spaced apart arrangement as can easily be seen in Figures 2 and 3. The two pads 24 and 25 are positioned in a spaced apart relationship on the end of the other leg of the L-shaped flange 21, and further, the bearing surfaces of the pads 24 and 25 are disposed at a right angle to the bearing surfaces of the pads 22 and 23. The two pads 26 and 27 are disposed at the end of the same leg of the L-shaped flange 21 as the two pads 24 and 25, and also in a similar spaced apart relationship. However the bearing surfaces of the pads 26 and 27 are disposed at a right angle to the surfaces of the pads 24 and 25. The distance between the bearing surfaces of pads 22 and 23 and the bearing surfaces of pads 26, 27 is substantially equal to the width of the box channel 11. The intermediate portion of the tooth 20 is also provided with a slot 28. The slot 28 is positioned at the center of the tooth 20 in the upper webbing securing the L-shaped flange 21 to the rear of the tooth 20. The particular shape of the slot 28 is such that the slot 28 will cooperate with the lower forward edge of the plate 19 to laterally position the tooth 20 upon the rake frame.

The upper portion of the tooth 20 is formed to have a pair of spaced apart bearing blocks 29 on the rear thereof. An eye bolt 30, a pin 31, a nut 32 and a lock washer 33 are also provided. The eye bolt 30 is positionable between the bearing blocks 29 and the pin 31 is slidable through the bearing blocks 29 and the eye bolt 30 as can easily be seen in Figure 4. The lock washer 33 and the nut 32 are mountable upon the eye bolt 30.

The rake frame is further provided with a plurality of pillow blocks 34, ten in number. The pillow blocks 34 are generally U-shaped and are welded to one of the uppper inclined surfaces of the box channel 10 in a spaced apart relationship to each other. The side walls of the pillow blocks 34 are spaced apart a distance sufficient to permit insertion therebetween of the bearing blocks 29 of each of the rake teeth with the pins 31 mounted therein as can easily be seen in Figure 4. The pillow blocks 34 are further provided with openings for the passage of the shanks of the eye bolts 30 therethrough.

Turning next to a description of the operation of the instant invention, reference is again made to the drawings. The rake frame may be mounted by any suitable means well known in the art at the forward end of a tractor. The rake teeth are mounted individually to the rake frame, and in mounting are first rotated in a clockwise direction as viewed in Figure 2 so that the pads 26 and 27 may be hooked under the box channel 11. The rake tooth is then rotated in a counterclockwise direction as viewed in Figure 2, and the eyebolt 30 is projected through the opening in the pillow block 34, moving the bearing blocks 29 between the side walls of the pillow block 34. The slot 28 engages the lower forward edge of the plate 19 to laterally position the tooth 20 on the rake frame. The lock washer 33 is then placed upon the portion of the eye bolt 30 extending from the upper surface of the pillow block 34 and the nut 32 is threaded thereon, the nut 32 is then tightened to a degree wherein the rake tooth is sprung into a secure mounting arrangement on the rake frame. The rake tooth is then tightly maintained upon the rake frame through the pads 22, 23, 24, 25, 26 and 27 and the pillow block 34. Due to the mounting arrangement of the rake teeth and the rake frame, the complete rake will withstand severe forces applied against the rake teeth from any direction.

Since the only nuts and bolts are positioned substantially at the top of the rake, these fasteners will not be damaged through any hard use of the rake. The intermediate portion of the rake can withstand hard use without any damage thereto.

To remove or replace any one or more of the rake teeth, it is merely necessary to loosen and remove the nut 32 and the lock washer 33. The tooth can then be rotated in a clockwise direction as viewed in Figure 2, disengaging the eye bolt 30 from the pillow block 34 and the pads 22, 23, 24, 25, 26 and 27 from the box channel 11 to free the tooth from the rake frame. The eye bolt 30 may then be removed from the bearing blocks 29 by simply sliding the pin 31 from engagement with these parts. The pin 31 is prevented from slipping from the bearing blocks 29 when the rake is in use by the projecting side walls of the pillow block 34.

Having described the invention what is considered new and desired to be protected by Letters Patent is:

1. A land clearing rake comprising a rake frame formed of upper and lower box channels, a plurality of plates, said plurality of plates mounted in a parallel spaced apart relationship between said upper and lower box channels, a plurality of rake teeth, hook means formed on each of said rake teeth, a notch formed in each of said hook means formed on each of said rake teeth, said hook means mounted about a portion of said lower box channel, each of said notches engaging one of said plates whereby each of said rake teeth is laterally spaced and maintained on said rake frame, and fastening means mounted to said upper box channel and to the upper end of each of said rake teeth for stressing each of said rake teeth toward said upper box channel to maintain each of said rake teeth securely mounted to said rake frame.

2. A land clearing rake comprising a rake frame formed of upper and lower box channels, a plurality of rake teeth, hook means formed on each of said rake teeth, said hook means mounted about a portion of said lower box channel, a plurality of pillow blocks mounted on said upper box channel, a pair of bearing blocks mounted to the upper end of each of said rake teeth, a plurality of eye bolts, a pin rotatively mounted through each bearing block of each pair of said bearing blocks, and one of said eye bolts, each of said eye bolts positioned through one of said pillow blocks, a nut threaded onto each of said eye bolts for drawing each of said eye bolts through said pillow blocks for stressing each of said rake teeth to maintain each of said rake teeth securely mounted to said rake frame.

3. In a land clearing rake as claimed in claim 2, each of said pillow blocks having a pair of spaced apart walls formed thereon, each pair of said walls positioned to enclose one of said pair of bearing blocks and one of said pins, whereby said pins are prevented from sliding from said bearing blocks.

4. In a land clearing rake comprising a rake frame having a box channel, the unitary structure of a rake tooth comprising an upper, an intermediate and a lower portion, an L-shaped flange integrally formed on the rear of said intermediate portion, a pad mounted at one end of one leg of said L-shaped flange, a pair of pads mounted on the end of the other leg of said L-shaped flange with each pad of said pair of pads disposed at a right angle to each other, said L-shaped flange and said pads being relatively positioned in three planes to define an upwardly open hook engaging opposite and adjacent sides of said box channel, and mounting means mounted on the upper portion of said rake tooth for securing said upper portion mounted on said rake frame and maintaining said L-shaped flange and said pads hooked about said box channel.

5. In a land clearing rake, a rake frame comprising a box channel, said box channel longitudinally disposed in a horizontal direction with the sides thereof lying in inclined planes, the unitary structure of a rake tooth having upper, intermediate and lower portions, an L-shaped flange formed on the rear of said intermediate portion, said L-shaped flange having pads formed at the ends thereof and positioned in three planes to define an upwardly open hook engaging opposite and adjacent sides of said box channel, fastening means mounted on the upper portion and to said rake frame for maintaining said L-shaped flange hooked about said box channel and for maintaining said upper portion of said rake tooth mounted on said rake frame.

6. In a land clearing rake, a rake frame comprising a box channel, said box channel disposed with the sides thereof lying in inclined planes, the unitary structure of a rake tooth comprising upper, intermediate and lower portions, an L-shaped flange formed on the rear of said intermediate portion, said L-shaped flange having pads formed thereon, said pads having bearing surfaces positioned in three planes, said three planes forming an upwardly open hook substantially of the dimensions of said box channel, said pads being position about the back, lower and forward walls of said box channel ,and fastening means mounted on said upper portion and to said rake frame for drawing said upper portion toward said rake frame to maintain said pads secured about said box channel.

7. In a land clearing rake having a rake frame comprising a box channel wherein the sides thereof lie in inclined planes, the unitary structure of a rake tooth comprising upper, intermediate and lower portions, said portions formed to have a forward curved face of a certain radius of curvature, an L-shaped flange formed on said intermediate portion rearwardly of said curved face, said L-shaped flange having pads formed thereon, said pads having bearing surfaces positioned in three planes, said three planes forming an upwardly open hook of the dimensions of said box channel, said pads being positioned about the rear, lower and forward walls of said box channel, and fastening means mounted on said upper portion rearwardly of the curved face thereof and connected to said rake frame for drawing said upper portion towards said rake frame to stress said rake tooth, to lengthen said certain radius of curvature to thereby maintain said pads securely mounted about said box channel.

8. In a land clearing rake, a unitary structure of a rake tooth comprising integrally formed upper, intermediate and lower portions, said portions comprising a curved face, said curved face having a certain radius of curvature, and mounting means mounted on said upper and said intermediate portions rearwardly of said curved face for mounting said rake tooth to the rake frame, said mounting means operating to stress said rake tooth to lengthen the radius of curvature of said curved face when said rake tooth is mounted to said rake frame, said mounting means comprising a hook-shaped flange mounted on said intermediate portion rearwardly of said curved face, said mounting means further comprising an eye bolt and a nut threaded thereon, said eye bolt pivotally mounted on said upper portion rearwardly of said curved face.

References Cited in the file of this patent

UNITED STATES PATENTS

| | | |
|---|---|---|
| 1,511,292 | McLeod | Oct. 14, 1924 |
| 2,297,677 | Forte | Oct. 6, 1942 |
| 2,371,549 | Sembler et al. | Mar. 13, 1945 |
| 2,384,957 | Murphy | Sept. 18, 1945 |
| 2,416,654 | Taylor | Feb. 25, 1947 |
| 2,726,463 | Rogers | Dec. 13, 1955 |
| 2,735,197 | Struemph | Feb. 21, 1956 |

FOREIGN PATENTS

| | | |
|---|---|---|
| 481,146 | Canada | Feb. 12, 1952 |